(12) United States Patent
Jing (10) Patent No.: US 9,933,663 B2
(45) Date of Patent: Apr. 3, 2018

(54) FRICTION ROLLER AND METHOD FOR USING THE SAME (71) Applicants: Boe Technology Group Co., Ltd., Beijing (CN); Hefei Boe Optoelectronics Technology Co., Ltd., Hefei, Anhui (CN)

(72) Inventor: Yangkun Jing, Beijing (CN)

(73) Assignees: BOE TECHNOLOGY GROUP CO., LTD., Beijing (CN); HEFEI BOE OPTOELECTRONICS CO., LTD., Hefei, Anhui (CN)

( * ) Notice: Subject to any disclaimer, the term of this patent is extended or adjusted under 35 U.S.C. 154(b) by 30 days.

(21) Appl. No.: 14/912,882

(22) PCT Filed: Jul. 22, 2015

(86) PCT No.: PCT/CN2015/084768
§ 371 (c)(1),
(2) Date: Feb. 18, 2016

(87) PCT Pub. No.: WO2016/155156
PCT Pub. Date: Oct. 6, 2016

(65) Prior Publication Data
US 2017/0038627 A1 Feb. 9, 2017

(30) Foreign Application Priority Data
Apr. 3, 2015 (CN) .......................... 2015 1 0157730

(51) Int. Cl.
*G02F 1/13* (2006.01)
*G02F 1/1337* (2006.01)

(52) U.S. Cl.
CPC ........ *G02F 1/13378* (2013.01); *G02F 1/1303* (2013.01); *G02F 1/1337* (2013.01);
(Continued)

(58) Field of Classification Search
CPC .. G02F 1/13378; G02F 1/1303; G02F 1/1337; G05D 5/03
(Continued)

(56) References Cited

U.S. PATENT DOCUMENTS 3,569,747 A * 3/1971 Siegel .................. B06B 1/0651
310/319
4,019,072 A * 4/1977 Mifune .................. G01F 23/18
310/317
(Continued)

FOREIGN PATENT DOCUMENTS

CN 102207652 10/2011
CN 202281887 U 6/2012
(Continued)

OTHER PUBLICATIONS

Office Action in Chinese Application No. 201510157730.7 dated Jan. 25, 2017, with English translation. 7 pages.
(Continued)

*Primary Examiner* — Jason L Vaughan
(74) *Attorney, Agent, or Firm* — Womble Bond Dickinson (US) LLP (57) ABSTRACT

The disclosure discloses a friction roller comprising: a friction roller body comprising an inner cylinder and a pattern-variable module wrapped outside the inner cylinder; and a controller connected with the pattern-variable module. The controller controls the pattern-variable module to deform according to step information of a surface for friction. Also disclosed is a method for using the friction roller. Embodiments of the disclosure enable alignment grooves with the same depth to be formed on the surface for friction by way of the friction roller, thereby reducing stripes on the surface for friction and enhancing the display effect.

12 Claims, 6 Drawing Sheets (52) U.S. Cl.
CPC ............... *G02F 1/133784* (2013.01); *G02F 2001/133776* (2013.01)

(58) Field of Classification Search
USPC ..................................................... 492/10, 11
See application file for complete search history.

(56) References Cited

U.S. PATENT DOCUMENTS

| | | | | |
|---|---|---|---|---|
| 4,062,097 | A * | 12/1977 | Riihinen | D21G 1/0213 100/917 |
| 4,485,540 | A * | 12/1984 | Riihinen | D21G 1/0213 492/7 |
| 4,793,041 | A * | 12/1988 | Jenkins | B41F 31/26 101/348 |
| 5,233,921 | A * | 8/1993 | John | B41F 31/26 101/352.13 |
| 5,290,223 | A * | 3/1994 | Lehmann | F16C 13/028 492/2 |
| 5,520,977 | A * | 5/1996 | Snelling | G03G 15/1685 399/313 |
| 5,813,959 | A * | 9/1998 | Hader | B21B 27/055 492/16 |
| 5,852,589 | A * | 12/1998 | Wilson | H04R 17/005 310/334 |
| 6,109,285 | A * | 8/2000 | Kivioja | D21G 1/022 137/14 |
| 6,198,207 | B1 * | 3/2001 | Lally | G01P 15/0915 310/340 |
| 6,299,571 | B1 * | 10/2001 | White | B21B 37/007 492/10 |
| 6,308,623 | B1 * | 10/2001 | Schonberger | B41F 31/26 101/153 |
| 6,524,229 | B2 * | 2/2003 | Pramila | G01L 5/105 492/10 |
| 6,662,630 | B2 * | 12/2003 | Onnela | D21G 1/022 492/10 |
| 7,814,830 | B2 * | 10/2010 | Rene | B41M 1/00 101/395 |
| 7,816,838 | B2 * | 10/2010 | Leskinen | G01L 1/16 310/319 |
| 7,873,309 | B2 * | 1/2011 | Mestha | G03G 15/0818 399/252 |
| 8,055,165 | B2 * | 11/2011 | Mestha | G03G 15/0818 399/252 |
| 8,055,166 | B2 * | 11/2011 | Mestha | G03G 15/0818 399/252 |
| 8,602,915 | B2 * | 12/2013 | Oldknow | A63B 37/0012 473/378 |
| 2012/0090409 | A1 * | 4/2012 | Luthje | G01L 1/18 73/862.627 |

FOREIGN PATENT DOCUMENTS

| | | |
|---|---|---|
| CN | 202837753 | 3/2013 |
| CN | 103698941 | 4/2014 |
| CN | 103728778 | 4/2014 |
| CN | 104698688 | 6/2015 |
| JP | 2004258192 | 9/2004 |
| JP | 2007011173 A | 1/2007 |
| TW | 201217869 | 5/2012 |

OTHER PUBLICATIONS

International Search Report and Written Opinion with English Language Translation, dated Dec. 28, 2015, Application No. PCT/CN2015/084768.

* cited by examiner

FRICTION ROLLER AND METHOD FOR USING THE SAME

FIELD OF THE DISCLOSURE

The disclosure relates to the field of liquid crystal display technologies, and in particular, to a friction roller and a method for using the same.

BACKGROUND OF THE DISCLOSURE

A liquid crystal panel in a liquid crystal display comprises a substrate, and a surface of the substrate is filled with a plurality of liquid crystal molecules. By controlling the arrangement direction of the plurality of liquid crystal molecules, the effect of displaying a different image may be achieved. In the liquid crystal panel, in order to achieve control of liquid crystal molecules, it is necessary to align a plurality of liquid crystal molecules such that the plurality of liquid crystal molecules located on the substrate surface are arranged uniformly in the same direction.

In the prior art, the substrate surface is made to have an alignment capability by causing a friction roller to roll relative to the substrate surface. In particular, the friction roller is a cylinder with an outer surface being wrapped with friction cloth, and the surface of the friction cloth is provided with a plurality of fibers. When the friction roller is rolling on the substrate surface along a set direction, the fibers on the friction cloth can exert to the substrate surface a pressure perpendicular to the substrate surface and a friction force along the direction in which the friction roller is rolling, such that alignment grooves with a consistent direction are formed on the substrate surface. Then, a plurality of liquid crystal molecules are dripped into the alignment grooves of the substrate surface, such that the liquid crystal molecules are uniformly arranged on the substrate surface according to a certain direction along the alignment grooves, realizing alignment of the plurality of liquid crystal molecules.

If there is a step on the surface of the substrate (i.e., a difference in height between the substrate surface and a preset plane), then when the friction roller is rolling on the substrate surface along a set direction, the pressure exerted by the fibers of the friction cloth on the friction roller to a portion of the substrate surface with a step is different from that to a portion without a step, such that the deformation of the fibers of the friction cloth is different when the friction roller is rolling. When the friction roller continues rolling on the substrate surface along the set direction, since the deformation of the fibers of the friction cloth on the friction roller is different, the depths of the alignment grooves formed on the substrate surface by the fibers of the friction cloth will be inconsistent, such that the plurality of liquid crystal molecules can not be located in one and the same plane, and thereby the reflection of light rays will be different. This will produce stripes on the liquid crystal panel and thus affect the display effect.

SUMMARY OF THE DISCLOSURE

An object of the disclosure is to provide a friction roller and a method for using the same, so as to solve the problem that stripes are produced on the liquid crystal panel made of a substrate and affect the display effect due to the inconsistent depths of the alignment grooves formed on the surface of the substrate by the friction roller.

According to a first aspect of the disclosure, a friction roller is provided comprising: a friction roller body comprising an inner cylinder and a pattern-variable module wrapped outside the inner cylinder; and a controller connected with the pattern-variable module. The controller controls the pattern-variable module to deform according to step information of a surface for friction.

Optionally, the pattern-variable module comprises a first deformation layer comprising a plurality of first deformation units, and the controller controls one or more of the first deformation units to deform in a radial thickness direction according to the step information of the surface for friction.

Optionally, the controller is further connected with a detection machine, and the detection machine, in response to instruction information instructing to detect a step generated by the controller, acquires the step information of the surface for friction and sends the step information to the controller.

Optionally, the detection machine is configured to acquire an image of the surface for friction and to obtain the step information of the surface for friction according to the image of the surface for friction.

Optionally, the pattern-variable module comprises a second deformation layer comprising a plurality of second deformation units, and the friction roller body further comprises a deformation perception layer comprising a plurality of perception units corresponding to the plurality of second deformation units one to one, the second deformation layer and the deformation perception layer successively wrapped outside the inner cylinder. The controller is connected with the deformation perception layer and configured to acquire pressure sensing signals generated by the plurality of perception units according to magnitudes of undergone pressures and control one or more of the second deformation units to deform according to the pressure sensing signals.

Optionally, each of the plurality of perception units is provided with a first electrode, a second electrode, and insulation substance located between the first electrode and the second electrode, the first electrode and the second electrode forming a capacitor, and the perception unit is configured to generate the pressure sensing signal by producing a corresponding number of electric charges that cause a change in the number of the electric charges stored in the capacitor after undergoing a pressure.

Optionally, the insulation substance is piezoelectric ceramic.

Optionally, the plurality of perception units are made from pressure-sensitive conductive rubber.

Optionally, in the friction operation, the friction roller body further comprises friction cloth wrapped outside the pattern-variable module.

Optionally, the pattern-variable module is made from an inverse piezoelectric material, and the controller applies an electric signal to the inverse piezoelectric material according to the step information of the surface for friction to cause a thickness of the inverse piezoelectric material to change.

Optionally, an absolute value of an amount of change in the thickness is greater than zero and less than or equal to a height of a maximum step of the surface for friction.

According to a second aspect of the disclosure, a method is provided for using a friction roller. The friction roller comprises a friction roller body and a controller. The friction roller body comprises an inner cylinder and a pattern-variable module wrapped outside the inner cylinder. The controller is connected with the pattern-variable module. The method for using a friction roller comprises: controlling by the controller the pattern-variable module to deform according to step information of a surface for friction.

Optionally, the pattern-variable module comprises a first deformation layer comprising a plurality of first deformation units, and controlling by the controller the pattern-variable module to deform according to the step information of the surface for friction comprises: controlling by the controller one or more of the first deformation units to deform in a radial thickness direction according to the step information of the surface for friction.

Optionally, the controller is connected with a detection machine, and before controlling by the controller the first deformation unit to deform in the radial thickness direction according to the step information of the surface for friction, the method for using a friction roller further comprises: generating by the controller instruction information instructing to detect a step; acquiring by the detection machine the step information of the surface for friction in response to the instruction information; and sending by the detection machine the step information of the surface for friction to the controller.

Optionally, acquiring by the detection machine the step information of the surface for friction in response to the instruction information comprises: acquiring by the detection machine an image of the surface for friction; and obtaining by the detection machine the step information of the surface for friction according to the image of the surface for friction.

Optionally, the pattern-variable module comprises a second deformation layer comprising a plurality of second deformation units, and the friction roller body further comprises a deformation perception layer comprising a plurality of perception units corresponding to the plurality of second deformation units one to one, the second deformation layer and the deformation perception layer successively wrapped outside the inner cylinder, the controller connected with the deformation perception layer. Before controlling by the controller the pattern-variable module to deform according to the step information of the surface for friction, the method for using a friction roller further comprises: acquiring by the controller pressure sensing signals generated by the plurality of perception units according to magnitudes of undergone pressures. Controlling by the controller the pattern-variable module to deform according to the step information of the surface for friction comprises: controlling by the controller one or more of the second deformation units to deform according to the pressure sensing signals.

In the friction roller and the method for using the same according to embodiments of the disclosure, the controller may control the pattern-variable module to deform according to the step information of the surface for friction, such that when the friction roller is rolling on the surface for friction, the pressure exerted by the surface of the friction roller to a portion of the surface for friction with a step is identical to that exerted to a portion without a step. Thus, alignment grooves with the same depth are formed on the surface for friction, such that the reflection of light rays by the surface for friction is identical. This reduces stripes of the surface for friction and therefore enhances the display effect.

It should be understood that the above general description and the following detailed description are just exemplary and explanatory, and do not limit the disclosure.

BRIEF DESCRIPTION OF THE DRAWINGS

For a more clear illustration of the technical solutions in embodiments of the disclosure, the appended drawings to be used in the embodiments will be introduced briefly below. Obviously, the drawings in the following description are only some embodiments of the disclosure. For those of ordinary skills in the art, other drawings may be derived from these drawings without making any inventive effort.

In the drawings.

00 is a friction roller, B is a substrate, B1 is a preset plane, x is a preset direction in which the friction roller rolls, and C is a position where there is a step on a substrate surface;

C1 is a position where there is a step on the substrate surface, and y is the height of the step at the position C1;

C2 is another position where there is a step on the substrate surface, and z is the height of the step at the position C2;

C3 is a position where there is a largest step on the substrate surface, and w is the height of the step at the position C3;

001 is a friction roller body, and 002 is a controller;

0011 is an inner cylinder, and 0012 is a pattern-variable module;

00121 is a first deformation layer, a is a first deformation unit, and a1 is a first deformation unit corresponding to the position C1;

D is a detection machine, and m is an axis of the inner cylinder;

0013 is a deformation perception layer, c is a perception unit, and c1 is a first perception unit; and 00122 is a second deformation layer, b is a second deformation unit, and b1 is a second deformation unit corresponding to the first perception unit.

DETAILED DESCRIPTION OF THE DISCLOSURE

Embodiments of the disclosure will be further described in detail below in connection with the drawings to make the objects, technical solutions and advantages of the disclosure clearer.

Figure 1:
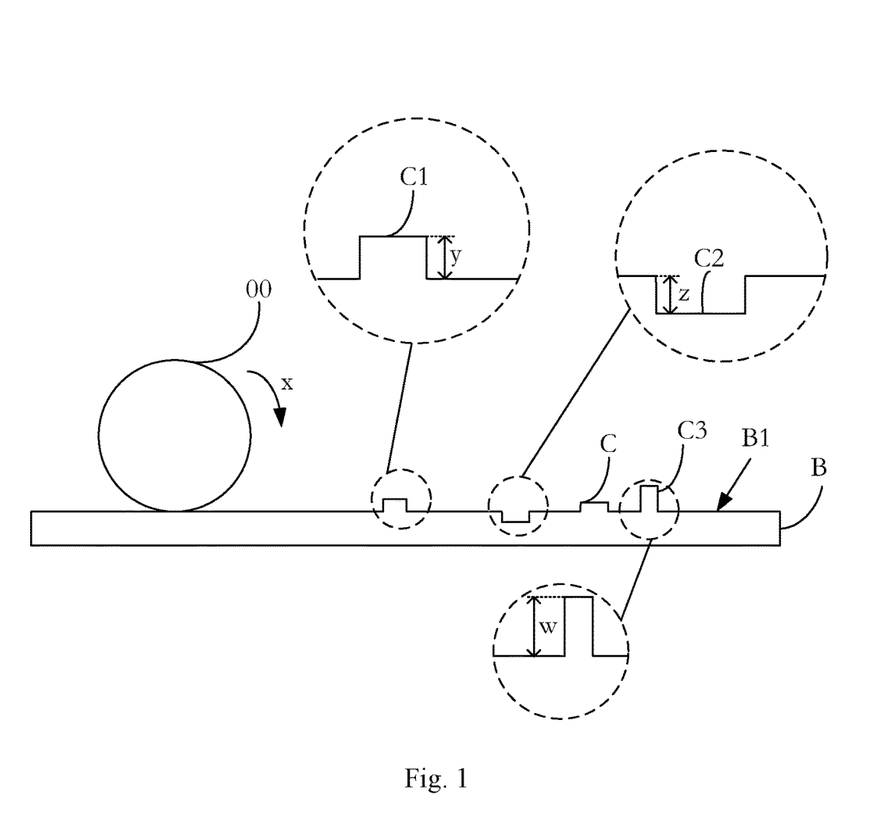
FIG. 1 is a diagram of an application scenario for a friction roller according to an embodiment of the disclosure.

FIG. 1 is a diagram of an application scenario for a friction roller 00 according to an embodiment of the disclosure. In this example, the surface for friction is a surface of the substrate B, although the surface for friction may also be other surface. The friction roller 00 may roll on the surface of the substrate B to cause the surface of the substrate B to have an alignment capability. In particular, when the friction roller 00 is rolling on the surface of the substrate B along a set direction x (as indicated by the arrow), the surface of the friction roller 00 will cause alignment grooves to be formed in a consistent direction on the surface of the substrate B. For the surface of the substrate B (i.e., the surface for friction), there is a position C with a step, namely, there is a difference in height between the position C and a preset plane B1. The height of the step at a position C1 is y, the height of the step at a position C2 is z, and the height of the largest step on the surface of the substrate B is the height w of the step at a position C3.

Figure 2:
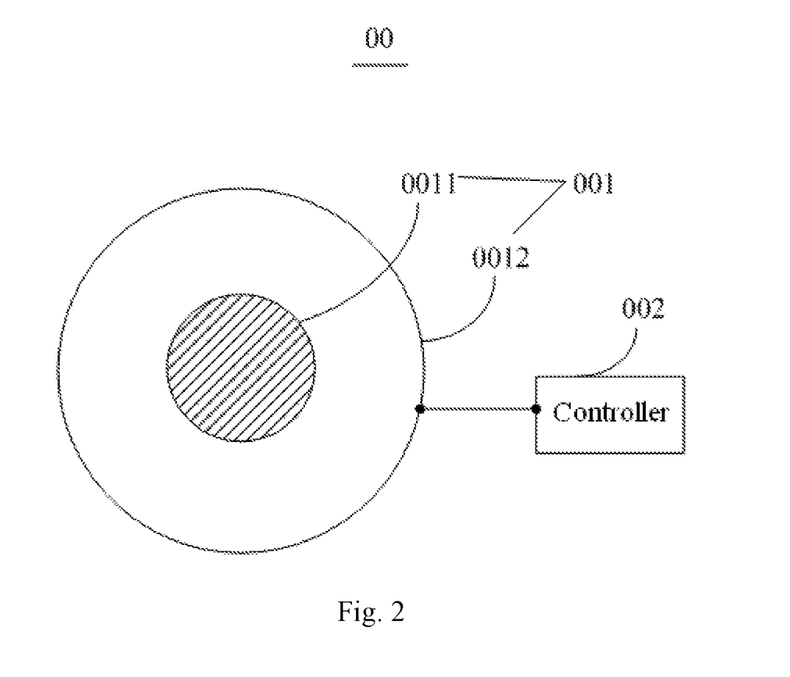
FIG. 2 is a structural schematic diagram of a friction roller according to an embodiment of the disclosure.

FIG. 2 is a structural schematic diagram of a friction roller 00 according to an embodiment of the disclosure. As illustrated, the friction roller 00 may comprise a friction roller body 001 and a controller 002. The friction roller body 001 may comprise an inner cylinder 0011 and a pattern-variable module 0012.

The inner cylinder 0011 may be a circular cylinder. The pattern-variable module 0012 may be wrapped outside the inner cylinder 0011, and is connected with the controller 002. The controller 002 is used for controlling the pattern-variable module 0012 to deform according to step information of the surface for friction (not shown in FIG. 2). As an example, the pattern-variable module 0012 may be made from an inverse piezoelectric material, which can convert electric energy into mechanical energy under control of the controller so as to deform.

To this end, the controller 002 may be further connected with a power supply (not shown in FIG. 2) for controlling the power supply to provide the friction roller 00 (specifically, the pattern-variable module 0012 made from the inverse piezoelectric material) with electric energy as needed in operation. The controller 002 may apply an electric signal to the pattern-variable module 0012 according to the step information of the surface of the substrate, such that the thickness of the pattern-variable module 0012 changes. When the controller 002 controls the thickness of the pattern-variable module 0012 to change, the absolute value of the amount of change in the thickness of the pattern-variable module 0012 is greater than zero, and less than or equal to the height of the maximum step of the surface of the substrate B (e.g., the height w as shown in FIG. 1).

In addition, in the friction operation, the friction roller body 001 further comprises friction cloth (not shown in FIG. 2), and the friction cloth may be wrapped outside the pattern-variable module 0012 and deforms as the pattern-variable module 0012 deforms. As is known, the fibers on the friction cloth can exert to the substrate surface a pressure perpendicular to the substrate surface and a friction force along the direction in which the friction roller is rolling, and thus causes alignment grooves with a consistent direction to be formed on the substrate surface. However, the friction cloth itself is not a key feature of the inventive concept, and therefore will not be described in detail.

Figure 3:
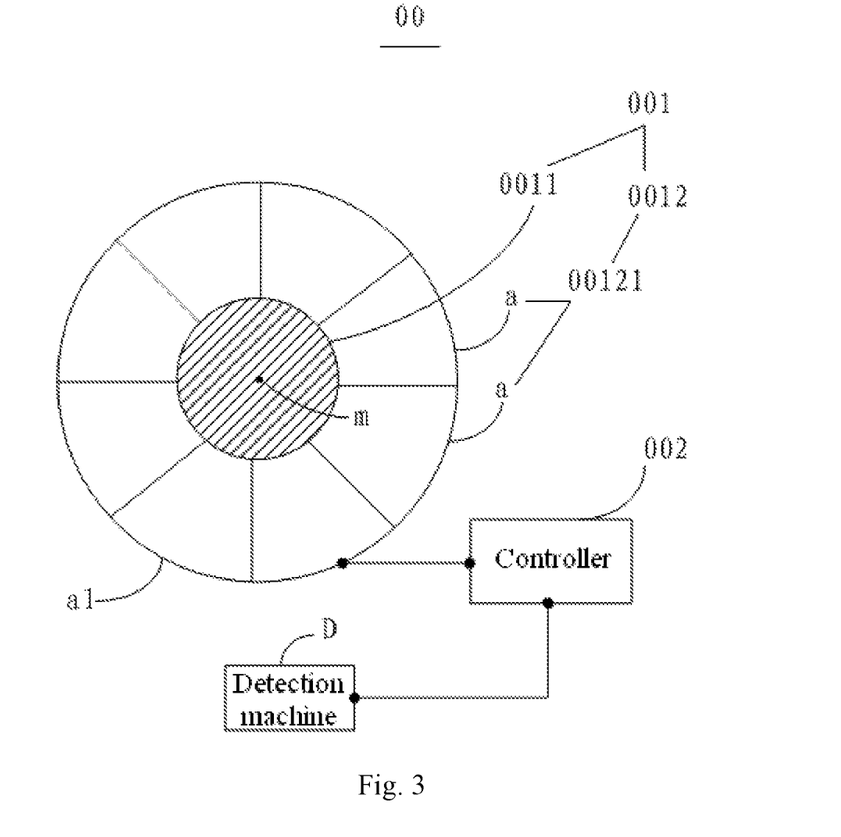
FIG. 3 is a structural schematic diagram of an implementation of the friction roller as shown in FIG. 2.

FIG. 3 is a structural schematic diagram of an implementation of the friction roller 00 as shown in FIG. 2. As illustrated, the pattern-variable module 0012 may comprise a first deformation layer 00121, the first deformation layer 00121 may comprise a plurality of first deformation units a. As an example, the plurality of first deformation units a may be arranged in a circumferential array with respect to an axis m of the inner cylinder 0011 (which is perpendicular to the paper). For the purpose of illustration, in FIG. 3, only 8 first deformation units a are shown in the cross section of the friction roller 00. However, the sizes and number of the first deformation units a may be adapted to the sizes of the steps. Additionally, although only the cross section of the friction roller 00 is shown, a plurality of first deformation units a may also be disposed in the direction of length along the axis m of the friction roller 00.

The controller 002 may be connected with a detection machine D. In this implementation, the detection machine D may acquire an image (e.g., an infrared image) of the substrate surface, and obtain the step information (e.g., the position and the height of the step) of the substrate surface by detecting the image of the substrate surface. It is to be noted that the infrared detection technique is just an example, and that the detection machine D may also acquire the step information of the substrate surface by other means (e.g., by detecting an optical path difference when light passes through the substrate). Such a detection technique is known in the art and therefore will not be described here in detail.

The controller 002 is used for generating instruction information instructing to detect a step, and sending the instruction information to the detection machine D. The detection machine D is used for acquiring the step information of the substrate surface according to the received instruction information, and sending the step information of the substrate surface to the controller 002. In particular, the detection machine D may acquire the position of a step and the height of the step on the substrate surface, and then send the position and the height to the controller 002. As an example, the controller 002 may keep track of a correspondence relationship between individual positions of the substrate surface and the first deformation units a. The controller 002 may determine, from the correspondence relationship between individual positions of the substrate surface and the first deformation units a and the position of a step on the substrate surface, the first deformation unit a which corresponds to the position of the step of the substrate surface. Since the friction roller 00 rolls on the substrate surface, it is possible that one first deformation unit a corresponds to a plurality of step positions. As such, the controller 002 may record a first deformation unit a corresponding to the step position taking into account the time for the friction roller 00 to roll from an initial position to the step position. The controller 002 is further used for, according to the height of the step and the first deformation unit a corresponding to the step position, controlling the corresponding first deformation unit to deform (at a set time) in a radial thickness direction correspondingly to the step. The set time corresponds to the time for the friction roller 00 to roll from the initial position to the step position.

In the example as shown in FIG. 1, if the position C1 of the surface of the substrate B is above the preset plane B1 and the height of the step at the position C1 equals 5 mm (millimeter), then the step at the position C1 is +5 mm. With reference to FIG. 1 and FIG. 3, before the friction roller 00 rolls along a set direction, the controller 002 may generate instruction information instructing to detect a step, and send the instruction information to the detection machine D. The detection machine D acquires the position and height of the step, and sends the position and height of the step back to the controller 002. As an example, the position of the step may be the coordinate of the position C1. Further, the controller 002 may determine, from the correspondence relationship between individual positions of the surface of the substrate B and the first deformation units a and the position (i.e., the position C1) of the step, the first deformation unit a1 which corresponds to the position C1. Then, according to the height of the step at the position C1, the controller 002 controls the first deformation unit a1 corresponding to the position C1 to recess 5 mm (at a set time) towards the axis m of the inner cylinder 0011 along a direction perpendicular to the surface of the pattern-variable module 0012. After the friction roller 00 passes the position C1, the controller 002 controls the pattern-variable module 0012 to be reinstated. In this way, when the friction roller 00 is rolling on the surface of the substrate B, the pressure exerted by the surface of the friction roller 00 to the position C1 is identical to that exerted to the preset plane B1, such that when the friction roller 00 is rolling, the fibers of the friction cloth on the surface of the friction roller 00 deform identically, and thereby cause alignment grooves with a consistent depth to be formed on the substrate surface.

It is to be noted that if the position C2 of the surface of the substrate B is below the preset plane B1, and the height of the step at the position C2 is equal to 4 mm, then the step at the position C2 is −4 mm. In such a case, the controller 002 may control the first deformation unit (not shown in FIG. 3) corresponding to the position C2 to protrude 4 mm away from the axis m of the inner cylinder 0011 along the direction perpendicular to the surface of the pattern-variable module 0012 at a set time.

Figure 4:
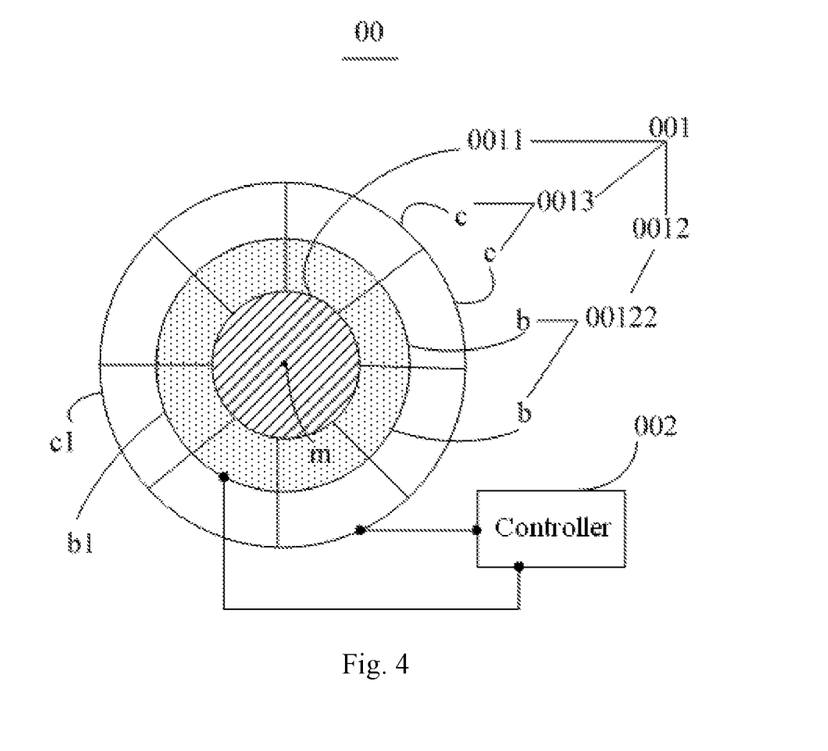
FIG. 4 is a structural schematic diagram of another implementation of the friction roller as shown in FIG. 2.

FIG. 4 is a structural schematic diagram of another implementation of the friction roller 00 as shown in FIG. 2. As illustrated, the pattern-variable module 0012 may comprise a second deformation layer 00122, and the second deformation layer 00122 may comprise a plurality of second deformation units b. As an example, the plurality of second deformation units b may be arranged in a circumferential array with respect to the axis m (which is perpendicular to the paper) of the inner cylinder 0011. The friction roller body 001 may further comprise a deformation perception layer 0013, and the deformation perception layer 0013 may comprise a plurality of perception units c. As an example, the plurality of perception units c may be arranged in a circumferential array with respect to the axis m of the inner cylinder 0011. Further, the plurality of perception units c correspond to the plurality of second deformation units b one to one, and the controller 002 may keep track of a correspondence relationship between the plurality of perception units c and the plurality of second deformation units b. The second deformation layer 00122 and the deformation perception layer 0013 may be successively wrapped outside the inner cylinder 0011. The deformation perception layer 0013 and the second deformation layer 00122 are connected with the controller 002, respectively.

The sizes and number of the perception units c and the second deformation units b may be adapted to the sizes of the steps. Additionally, although only the cross section of the friction roller 00 is shown in FIG. 4, a plurality of perception units c and a plurality of second deformation units b may also be disposed in the direction of length along the axis m of the friction roller 00.

In this implementation, the friction roller 00 rolls twice on the substrate surface. In the first rolling, the position and height of a step on the surface for friction are detected. In the second rolling, the actual friction operation is finished and alignment grooves are formed.

In the first rolling, the plurality of perception units c may generate corresponding pressure sensing signals (indicating heights of steps) according to the magnitudes of undergone pressures. In an example, each of the plurality of perception units c may be provided with a first electrode (not shown in FIG. 4), a second electrode (not shown in FIG. 4), and insulation substance located between the first electrode and the second electrode. The first electrode and the second electrode may form a capacitor. The insulation substance may for example be piezoelectric ceramic. Since the piezoelectric ceramic can generate a corresponding number of electric charges after undergoing a pressure, the number of stored electric charges in the capacitor formed by the first electrode and the second electrode changes, thereby generating a pressure induced current as a pressure sensing signal. In particular, during the friction roller 00 rolling along a set direction, when the pressure undergone by a first perception unit c1 of the plurality of perception units c is not zero, the first perception unit c1 undergoing the non-zero pressure can generate a corresponding pressure induced current according to the magnitude of the undergone pressure. The controller 002 may acquire the pressure induced current generated by the first perception unit c1 and the identification of the first perception unit c1. From the correspondence relationship between the plurality of perception units c and the plurality of second deformation units b and the identification of the first perception unit c1, the controller 002 may further determine the second deformation unit b1 corresponding to the first perception unit c1, and obtain the identification (a position indicative of a step) of the second deformation unit b1 corresponding to the first perception unit c1. In another example, the plurality of perception units c of the deformation perception layer 0013 may be made from pressure-sensitive conductive rubber. The pressure-sensitive conductive rubber is a sensitive material with a resistance strain effect, of which the resistance value may vary with the pressure. Therefore, the change in the resistance value of the pressure-sensitive conductive rubber may be taken as the pressure sensing signal. As compared to piezoelectric ceramic, it is easier for the conductive rubber to deform, and therefore it is suitable for detecting a specific step, for example, a recess or a protrusion with a larger height. Similarly, the controller 002 may acquire the change in the resistance value of the first perception unit c1 and the identification of the first perception unit c1. From the correspondence relationship between the plurality of perception units c and the plurality of second deformation units b and the identification of the first perception unit c1, the controller 002 may further determine the second deformation unit b1 corresponding to the first perception unit c1, and obtain the identification of the second deformation unit b1 corresponding to the first perception unit c1. As described above, the controller 002 may record the identification of the first perception unit c1 (and hence the second deformation unit b1) corresponding to the step taking into account the time for the friction roller 00 to roll from an initial position to the step position.

In the second rolling, in the case of a piezoelectric ceramic, the controller 002 may, according to the magnitude (indicating the height of the step) of the pressure induced current and the identification (indicating the position of the step) of the second deformation unit b1 corresponding to the first perception unit c1, control the second deformation unit b1 to deform at a set time. In the case of pressure-sensitive conductive rubber, the controller 002 may, according to the change (indicating the height of the step) in the resistance value and the identification (indicating the position of the step) of the second deformation unit b1 corresponding to the first perception unit c1, control the second deformation unit b1 to deform at a set time. As described above, the set time corresponds to the time for the friction roller 00 to roll from the initial position to the step position.

In the example as shown in FIG. 1, if the position C1 of the surface of the substrate B is above the preset plane B1 and the height of the step at the position C1 equals 5 mm, then the step at the position C1 is +5 mm. With reference to FIG. 4, during the friction roller 00 rolling along a set direction for the first time, the deformation perception layer 0013 undergoes a pressure corresponding to the step at the position C1. The first perception unit c1 in the deformation perception layer 0013 which undergoes a non-zero pressure can generate a corresponding pressure sensing signal according to the magnitude of the undergone pressure. The controller 002 acquires the pressure sensing signal generated by the first perception unit c1 and the identification of the first perception unit c1, then determines, from the correspondence relationship between the plurality of perception units c and the plurality of second deformation units b and the identification of the first perception unit c1, the second deformation unit b1 corresponding to the first perception unit c1, and then obtains the identification of the second deformation unit b1 corresponding to the first perception unit C1 during the second rolling of the friction roller 00, the controller 002 may, according to the magnitude of the pressure sensing signal and the identification of the second deformation unit b1 corresponding to the first perception unit c1, control the second deformation unit b1 corresponding to the first perception unit c1 to recess 5 mm (at a set time) towards the axis m of the inner cylinder 0011 along a direction perpendicular to the surface of the pattern-variable module 0012. After the friction roller 00 passes the position C1, the controller 002 controls the pattern-variable module 0012 to be reinstated. In this way, the pressure exerted by the surface of the friction roller 00 to the position C1 is identical to that exerted to the preset plane B1, such that when the friction roller 00 is rolling, the fibers of the friction cloth on the surface of the friction roller 00 deform identically, and thereby cause alignment grooves with a consistent depth to be formed on the substrate surface.

It is to be noted that if the position C2 of the surface of the substrate B is below the preset plane B1, and the height of the step at the position C2 is equal to 4 mm, then the step at the position C2 is −4 mm. In such a case, the controller 002 may control a second deformation unit corresponding to the perception unit corresponding to the position C2 to protrude 4 mm away from the axis m of the inner cylinder 0011 along the direction perpendicular to the surface of the pattern-variable module 0012 (at a set time).

Optionally, in the friction roller 00 as shown in FIG. 4, between the inner cylinder 0011 and the deformation perception layer 0013 may further be disposed a first deformation layer 00121 and a detection machine D as shown in FIG. 3, and the first deformation layer 00121 and the detection machine D are connected with the controller 002, respectively. The controller 002 may generate instruction information instructing to detect a step, and send the instruction information to the detection machine D. The detection machine D may acquire step information of a step on the substrate surface in response to the instruction information, and send the step information back to the controller 002. The controller 002 may further acquire a pressure sensing signal generated by the deformation perception layer 0013, and according to step information of steps on the substrate surface and the magnitude of the pressure sensing signal, control the thicknesses of the first deformation layer 00121 and the second deformation layer 00122 to change at a set time. After the friction roller 00 passes a step position, the controller 002 controls the first deformation layer 00121 and the second deformation layer 00122 to be reinstated. In this way, the pressure exerted by the surface of the friction roller 00 to a position of the substrate surface with a step is identical to that exerted to a position of the substrate surface without a step, such that when the friction roller 00 is rolling, the fibers of the friction cloth on the surface of the friction roller 00 deform identically.

In the prior art, for a substrate which is made using a high transmittance Higher Advanced Super Dimension Switch (HADS) technique, there are many steps on the surface, such that when a friction roller is rolling on the substrate surface along a set direction, the depths of alignment grooves are inconsistent, resulting in many stripes generated on the liquid crystal panel which affect the display effect. In the friction roller according to embodiments of the disclosure, the controller can control the pattern-variable module to deform according to the step information of the substrate surface, such that when the friction roller is rolling on the substrate surface, the fibers of the friction cloth on the surface of the friction roller deform identically, thereby forming alignment grooves with a consistent depth. This reduces stripes on the liquid crystal panel and enhances the display effect.

According to another aspect of the disclosure, a method is provided for using a friction roller. The friction roller may be a friction roller 00 as shown in FIG. 2, 3 or 4, which may comprise a friction roller body and a controller. The friction roller body may comprise an inner cylinder and a pattern-variable module. The method for using a friction roller may comprise: controlling by the controller the pattern-variable module to deform according to step information of a surface for friction.

Optionally, the pattern-variable module may comprise a first deformation layer, and the first deformation layer may comprise a plurality of first deformation units. Controlling by the controller the pattern-variable module to deform according to step information of a surface for friction may comprise: controlling by the controller a first deformation unit to deform in a radial thickness direction according to the step information of the surface for friction.

As an example, the controller is connected with a detection machine. Before the controller controls the first deformation unit to deform in the radial thickness direction according to the step information of the surface for friction, the method for using a friction roller may further comprise: generating by the controller instruction information instructing to detect a step; sending by the controller the instruction information to the detection machine; acquiring by the detection machine the step information of the surface for friction in response to the instruction information; and sending by the detection machine the step information of the surface for friction to the controller. Acquiring by the detection machine the step information of the surface for friction in response to the instruction information may comprise: acquiring by the detection machine an image of the substrate surface; and obtaining by the detection machine the step information of the surface for friction according to the image of the substrate surface.

Before controlling by the controller the pattern-variable module to deform according to step information of a surface for friction, the method for using a friction roller may further comprise: acquiring by the controller pressure sensing signals which are generated by a plurality of perception units according to the magnitudes of undergone pressures. Controlling by the controller the pattern-variable module to deform according to step information of a surface for friction may comprise: controlling by the controller a second deformation unit to deform according to the magnitude of a pressure sensing signal.

In an implementation, the friction roller may comprise a friction roller body and a controller. The friction roller body may comprise an inner cylinder and a pattern-variable module. The pattern-variable module may comprise a first deformation layer, and the first deformation layer may comprise a plurality of first deformation units. The controller is connected with a detection machine, and the surface for friction may be a surface of the substrate.

Figure 5:
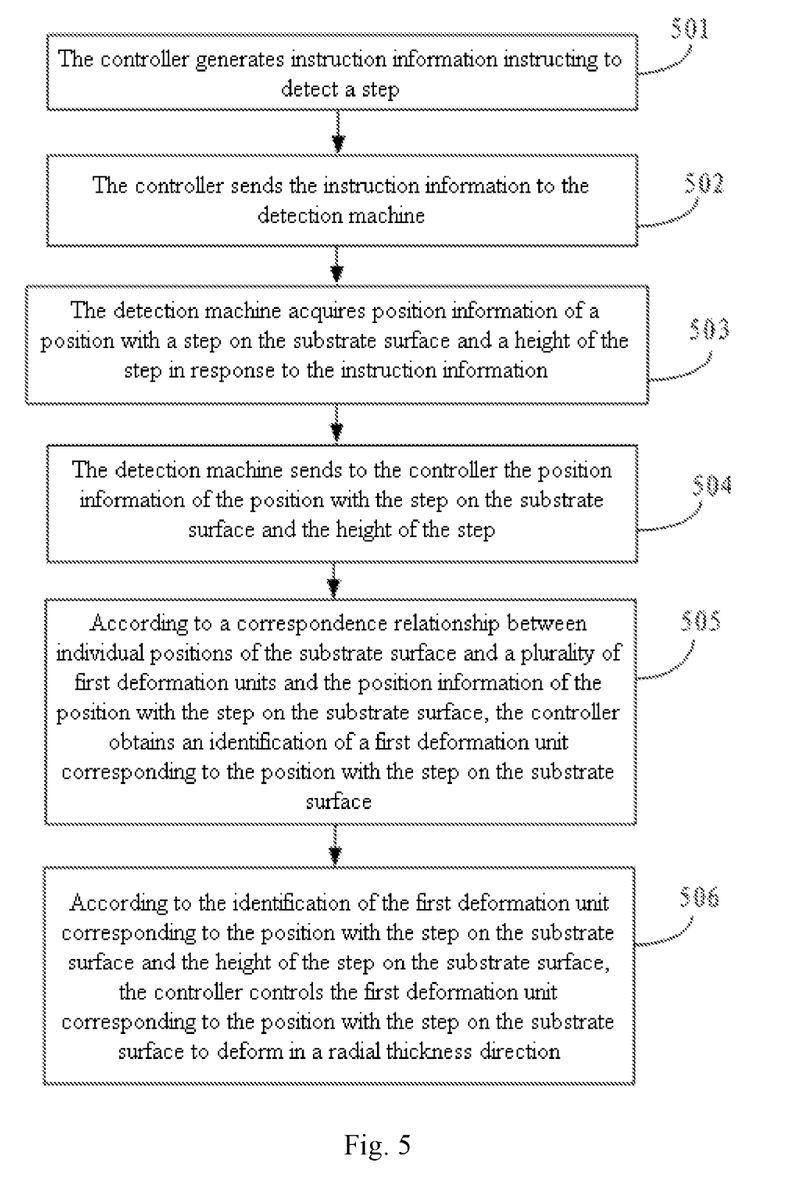
FIG. 5 is a flow chart of a method for using a friction roller according to an embodiment of the disclosure.

FIG. 5 is a flow chart of a method for using a friction roller according to an embodiment of the disclosure. The method for using a friction roller may comprise the following steps.

At step 501, the controller generates instruction information instructing to detect a step.

Optionally, before the friction roller rolls on the substrate surface along a set direction, the controller may generate the instruction information, which instruction information may instruct the detection machine to detect a step and may further instruct the detection machine to send the detection result back to the controller after detection of a step.

At step 502, the controller sends the instruction information to the detection machine.

Since the controller is connected with the detection machine, the controller may send the instruction information to the detection machine. As an example, both the controller and the detection machine are provided with a wireless transmission device, and the controller may send the instruction information to the detection machine via the wireless transmission device on the controller.

At step 503, the detection machine acquires a position and a height of a step of the substrate surface in response to the instruction information.

The detection machine can detect step information of the substrate surface, and the step information of the substrate surface may comprise the position and height of the step of the substrate surface. As described previously, the detection machine may acquire an image of the substrate surface, and obtain the position and height of the step of the substrate surface by detecting the image of the substrate surface. It is to be noted that the detection machine may also acquire the step information of the substrate surface by way of other means. In particular, if there is a step at a first position of the substrate surface, the detection machine may acquire position information of the first position and the step corresponding to the first position. The position information of the first position may be the coordinate of the first position.

At step 504, the detection machine sends the position and height of the step of the substrate surface to the controller.

Since the controller is connected with the detection machine, the controller can acquire the step information (e.g., the position and height) of the substrate surface via the detection machine.

At step 505, according to a correspondence relationship between individual positions of the substrate surface and a plurality of first deformation units and the position of the step on the substrate surface, the controller obtains an identification of a first deformation unit corresponding to the step on the substrate surface.

The controller may keep track of the correspondence relationship between individual positions of the substrate surface and the first deformation units. The controller can determine, from the correspondence relationship and the position of a step on the substrate surface, a first deformation unit corresponding to the step on the substrate surface, and obtain the identification of the corresponding first deformation unit. As an example, if there is a step at a first position of the substrate surface, the controller may determine, from the correspondence relationship between individual positions of the substrate surface and the first deformation units and the position information of the first position, a first deformation unit corresponding to the first position, and obtain the identification of the first deformation unit. As described previously, the controller 002 may record the identification of a first deformation unit corresponding to the step taking into account the time for the friction roller 00 to roll from an initial position to the step position.

At step 506, according to the identification of the first deformation unit corresponding to the step of the substrate surface and the height of the step of the substrate surface, the controller controls the first deformation unit corresponding to the step of the substrate surface to deform in a radial thickness direction at a set time. The set time corresponds to the time for the friction roller 00 to roll from the initial position to the step position.

In particular, if there is a step at a first position of the substrate surface, and the substrate surface at the first position is 5 mm above a preset plane, then the step at the first position is +5 mm. In such a case, the controller may, according to the step corresponding to the first position and the first deformation unit corresponding to the first position, control the first deformation unit to recess 5 mm towards the axis of the inner cylinder along a direction perpendicular to the surface of the pattern-variable module at a set time. After the friction roller passes the step position, the controller controls the pattern-variable module to be reinstated. In this way, when the friction roller is rolling on the substrate surface, the pressure exerted by the surface of the friction roller to the first position is identical to that exerted to the preset plane of the substrate, such that when the friction roller is rolling, the fibers of the friction cloth on the surface of the friction roller deform identically.

In another implementation, the friction roller may comprise a friction roller body and a controller. The friction roller body may comprise an inner cylinder and a pattern-variable module. The pattern-variable module may comprise a second deformation layer, and the second deformation layer comprises a plurality of second deformation units. The friction roller body further comprises a deformation perception layer comprising a plurality of perception units. The deformation perception layer is connected with the controller, and the surface for friction may be a substrate surface.

Figure 6:
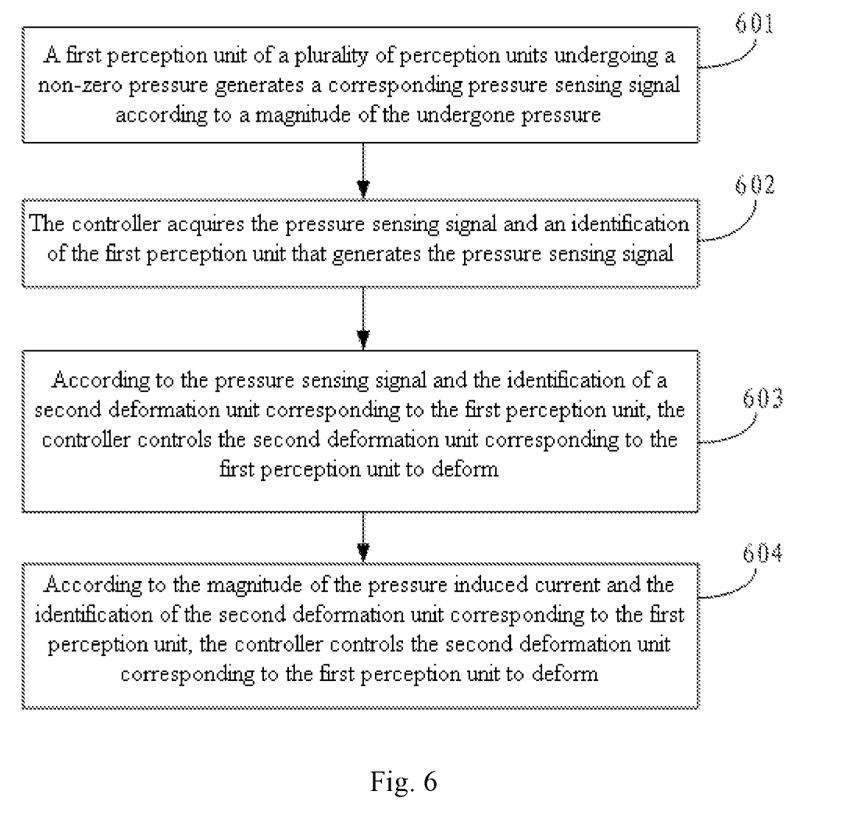
FIG. 6 is a flow chart of another method for using a friction roller according to an embodiment of the disclosure.

FIG. 6 is a flow chart of another method for using a friction roller according to an embodiment of the disclosure. The method for using a friction roller may comprise the following steps.

At step 601, a first perception unit of a plurality of perception units undergoing a non-zero pressure generates a corresponding pressure sensing signal (indicating the height of a step) according to a magnitude of the undergone pressure.

When the friction roller is rolling on the substrate surface along a set direction, the deformation perception layer undergoes a pressure corresponding to a step at a first position, and a first perception unit in the deformation perception layer undergoing a non-zero pressure can generate a corresponding pressure sensing signal according to the magnitude of the undergone pressure. In an example, the pressure sensing signal may be a pressure induced current.

At step 602, the controller acquires the pressure sensing signal and an identification of the first perception unit that generates the pressure sensing signal.

Since the controller is connected with the deformation perception layer, the controller can acquire the pressure sensing signal generated by the first perception unit and the identification of the first perception unit.

At step 603, according to a correspondence relationship between the plurality of perception units and a plurality of second deformation units and the identification of the first perception unit, the controller obtains an identification (indicating the position of the step) of a second deformation unit corresponding to the first perception unit.

Since each of the perception units corresponds to each of the second deformation units one to one, and the controller may keep track of a correspondence relationship between the plurality of perception units and the plurality of second deformation units, the controller may determine, from the correspondence relationship and the identification of the first perception unit, a second deformation unit corresponding to the first perception unit, and obtain the identification of the second deformation unit. As described previously, the controller may record the identification of the second deformation unit corresponding to the step taking into account the time for the friction roller to roll from an initial position to the step position.

As described previously, steps 601-603 may be performed in the first rolling to detect the position and height of the step on the surface for friction.

At step 604, according to the pressure sensing signal and the identification of the second deformation unit corresponding to the first perception unit, the controller controls the second deformation unit corresponding to the first perception unit to deform at a set time. The set time corresponds to the time for the friction roller 00 to roll from the initial position to the step position.

If the first position of the substrate surface is above the preset plane of the substrate surface, and the height of the step at the first position is equal to 5 mm, then the step at the first position is +5 mm. In an example, when the pressure sensing signal generated at step 601 is a pressure induced current, the controller may, according to the magnitude of the pressure induced current generated at step 601 and the identification of the second deformation unit corresponding to the first perception unit obtained at step 603, control the second deformation unit to recess 5 mm towards the axis of the inner cylinder along a direction perpendicular to the surface of the pattern-variable module at the set time. After the friction roller passes the step position, the controller controls the pattern-variable module to be reinstated. In this way, when the friction roller is rolling on the surface of the substrate, the pressure exerted by the surface of the friction roller to the first position is identical to that exerted to the preset plane, such that when the friction roller is rolling, the fibers of the friction cloth on the surface of the friction roller deform identically.

As described previously, step 604 may be performed in the second rolling to finish the actual friction operation and to cause alignment grooves to be formed. Therefore, when the friction roller rolls on the surface for friction once again, the depths of the alignment grooves formed by the friction roller on the surface for friction are identical, such that the reflection of light rays by the surface for friction is identical. This reduces stripes of the surface for friction and therefore enhances the display effect.

For all the above optional technical solutions, any combination thereof may be employed to form an optional embodiment of the disclosure, which will not be detailed here for simplicity.

The foregoing is only preferred embodiments of the disclosure, and is not intended to limit the disclosure. All modifications, equivalents and improvements that are made within the spirit and principle of the disclosure shall be regarded as encompassed within the scope of the disclosure.

The invention claimed is:

1. An apparatus for rubbing a surface of a substrate, comprising:
    a friction roller comprising:
        an inner cylinder, and
        a pattern-variable module wrapped outside the inner cylinder, the pattern-variable module comprising a deformation layer comprising a plurality of deformation units;
    a controller connected with the pattern-variable module; and
    a detection machine connected with the controller,
    wherein the detection machine is configured to, responsive to an instruction from the controller, acquire an optical image of the surface of the substrate, obtain step information of the surface based on the acquired image, and send the obtained step information to the controller, and
    wherein the controller is configured to control at least one of the deformation units to deform in a radial thickness direction according to the step information.

2. The apparatus as claimed in claim 1,
    wherein the friction roller further comprises a deformation perception layer comprising a plurality of perception units corresponding to the plurality of deformation units one to one, the deformation layer and the deformation perception layer successively wrapped outside the inner cylinder, and
    wherein the controller is further connected with the deformation perception layer and configured to acquire pressure sensing signals generated by the plurality of perception units according to magnitudes of undergone pressures and control the at least one of the deformation units to deform according to the pressure sensing signals, the pressure sensing signals being indicative of the step information of the surface of the substrate.

3. The apparatus as claimed in claim 2, wherein each of the plurality of perception units is provided with a first electrode, a second electrode, and insulation substance located between the first electrode and the second electrode, the first electrode and the second electrode forming a capacitor, and wherein the perception unit is configured to generate the pressure sensing signal by producing a corresponding number of electric charges that cause a change in the number of the electric charges stored in the capacitor after undergoing a pressure.

4. The apparatus as claimed in claim 3, wherein the insulation substance is piezoelectric ceramic.

5. The apparatus as claimed in claim 3, wherein the pattern-variable module is made from an inverse piezoelectric material, and wherein the controller is configured to control the at least one of the deformation units to deform by applying an electric signal to the inverse piezoelectric material to cause a change in a thickness of the inverse piezoelectric material.

6. The apparatus as claimed in claim 2, wherein the plurality of perception units are made from pressure-sensitive conductive rubber.

7. The apparatus as claimed in claim 2, wherein the pattern-variable module is made from an inverse piezoelectric material, and wherein the controller is configured to control the at least one of the deformation units to deform by applying an electric signal to the inverse piezoelectric material to cause a change in a thickness of the inverse piezoelectric material.

8. The apparatus as claimed in claim 1, wherein the friction roller further comprises friction cloth for being wrapped outside the pattern-variable module during a rubbing operation.

9. The apparatus as claimed in claim 1, wherein the pattern-variable module is made from an inverse piezoelectric material, and wherein the controller is configured to control the at least one of the deformation units to deform by applying an electric signal to the inverse piezoelectric material to cause a change in a thickness of the inverse piezoelectric material.

10. The apparatus as claimed in claim 9, wherein an absolute value of an amount of change in the thickness is greater than zero and less than or equal to a height of a maximum step of the surface of the substrate.

11. A method for rubbing a surface of a substrate using the apparatus as claimed in claim 1, the method comprising:

acquiring, by the detection machine, an optical image of the surface of the substrate;

obtaining, by the detection machine, step information of the surface based on the acquired image; and controlling, by the controller, at least one of the deformation units to deform in the radial thickness direction according to the obtained step information.

12. The method as claimed in claim 11, wherein the friction roller further comprises a deformation perception layer comprising a plurality of perception units corresponding to the plurality of deformation units one to one, the deformation layer and the deformation perception layer successively wrapped outside the inner cylinder, the controller connected with the deformation perception layer, wherein before controlling by the controller the at least one of the deformation units to deform, the method further comprises: acquiring by the controller pressure sensing signals generated by the plurality of perception units according to magnitudes of undergone pressures, and wherein controlling by the controller the at least one of the deformation units to deform comprises: controlling by the controller the at least one of the deformation units to deform according to the pressure sensing signals, the pressure sensing signals being indicative of the step information of the surface of the substrate.

* * * * *

UNITED STATES PATENT AND TRADEMARK OFFICE
CERTIFICATE OF CORRECTION

PATENT NO. : 9,933,663 B2  
APPLICATION NO. : 14/912882  
DATED : April 3, 2018  
INVENTOR(S) : Yangkun Jing Page 1 of 1

It is certified that error appears in the above-identified patent and that said Letters Patent is hereby corrected as shown below:

On the Title Page

In Item [73], under Assignee, at Line 2, please delete "HEFEI BOE OPTOELECTRONICS CO., LTD" and insert -- HEFEI BOE OPTOELECTRONICS TECHNOLOGY CO., LTD. --.

Signed and Sealed this  
Eleventh Day of August, 2020

Andrei Iancu  
*Director of the United States Patent and Trademark Office*